United States Patent
Mohrlock

(10) Patent No.: US 9,096,273 B2
(45) Date of Patent: Aug. 4, 2015

(54) APPARATUS FOR REINFORCING A SUPPORTING SUBFRAME

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/391,987

(22) PCT Filed: Mar. 30, 2013

(86) PCT No.: PCT/EP2013/000960
§ 371 (c)(1),
(2) Date: Oct. 10, 2014

(87) PCT Pub. No.: WO2013/152833
PCT Pub. Date: Oct. 17, 2013

(65) Prior Publication Data
US 2015/0076866 A1   Mar. 19, 2015

(30) Foreign Application Priority Data

Apr. 12, 2012 (DE) .......................... 10 2012 007 327

(51) Int. Cl.
*B62D 21/02* (2006.01)
*B62D 21/11* (2006.01)
*B60G 7/02* (2006.01)

(52) U.S. Cl.
CPC *B62D 21/11* (2013.01); *B60G 7/02* (2013.01); *B60G 2200/184* (2013.01);
(Continued)

(58) Field of Classification Search
CPC .... B60G 3/20; B60G 3/202; B60G 2200/184; B60G 2200/1442; B60G 2204/4302; B60G 2206/014; B60G 2206/604; B62D 21/11

USPC ............. 280/124.109, 124.11, 124.135, 280/124.143, 785
See application file for complete search history.

(56) References Cited

U.S. PATENT DOCUMENTS 4,529,222 A * 7/1985 Kijima et al. .......... 280/124.128
6,511,096 B1    1/2003 Kunert
(Continued)

FOREIGN PATENT DOCUMENTS

DE   10 2004 001 523    8/2005
DE   10 2004 057 176    3/2006
(Continued)

OTHER PUBLICATIONS

International Search Report issued by the European Patent Office in International Application PCT/EP2013/000960.

*Primary Examiner* — Paul N Dickson
*Assistant Examiner* — Darlene P Condra
(74) *Attorney, Agent, or Firm* — Henry M. Feiereisen LLC.

(57) ABSTRACT

The invention relates to an apparatus for reinforcing a supporting subframe for motor vehicles which is comprised of two longitudinal beams (30) and at least one crossbeam (32, 34), with the links (14, 16, 20, 22) of wheel suspensions on both sides being articulated to the longitudinal beams (30) via radially protruding, fixed mounts (36, 38) by rubber-metal sleeve bearings, and with the longitudinal beams (30) including at least in one region of articulation of a link (14) a longitudinally extending portion (30*b*) and a transversely extending portion (30*c*) which define in particular an approximately 90° curvature. According to the invention, the mounts (36, 38) are configured as two brackets, with one of which being supported on the longitudinally extending portion (30*b*) of the longitudinal beams (30) and the other one of which being supported on the transversely extending portion (30*c*).

12 Claims, 2 Drawing Sheets

(52) U.S. Cl.
CPC ...... *B60G 2204/143* (2013.01); *B60G 2204/15* (2013.01); *B60G 2204/4302* (2013.01); *B60G 2206/014* (2013.01); *B60G 2206/016* (2013.01); *B60G 2206/604* (2013.01)

(56) References Cited

U.S. PATENT DOCUMENTS

| | | | |
|---|---|---|---|
| 6,733,021 B1* | 5/2004 | Ziech et al. | 280/124.109 |
| 6,938,908 B2* | 9/2005 | Oda et al. | 280/124.109 |
| 7,125,027 B2* | 10/2006 | Sap et al. | 280/124.114 |
| 2005/0140112 A1 | 6/2005 | Kim | |
| 2007/0024044 A1* | 2/2007 | Ogawa et al. | 280/788 |
| 2009/0212548 A1 | 8/2009 | Frasch | |
| 2011/0068551 A1 | 3/2011 | Buschjohann | |
| 2011/0210539 A1* | 9/2011 | Lux et al. | 280/785 |
| 2012/0043736 A1 | 2/2012 | Okamoto | |
| 2013/0099460 A1* | 4/2013 | Tanaka et al. | 280/124.107 |

FOREIGN PATENT DOCUMENTS

| | | |
|---|---|---|
| DE | 10 2009 020 305 | 3/2009 |
| DE | 10 2010 030 292 | 12/2011 |
| EP | 0 307 547 | 3/1989 |
| EP | 1 035 003 | 9/2000 |
| EP | 2 093 131 | 8/2009 |
| JP | 2004-276735 | 10/2004 |
| WO | WO 2008/053035 | 5/2008 |
| WO | WO 2010/122837 | 10/2010 |

* cited by examiner

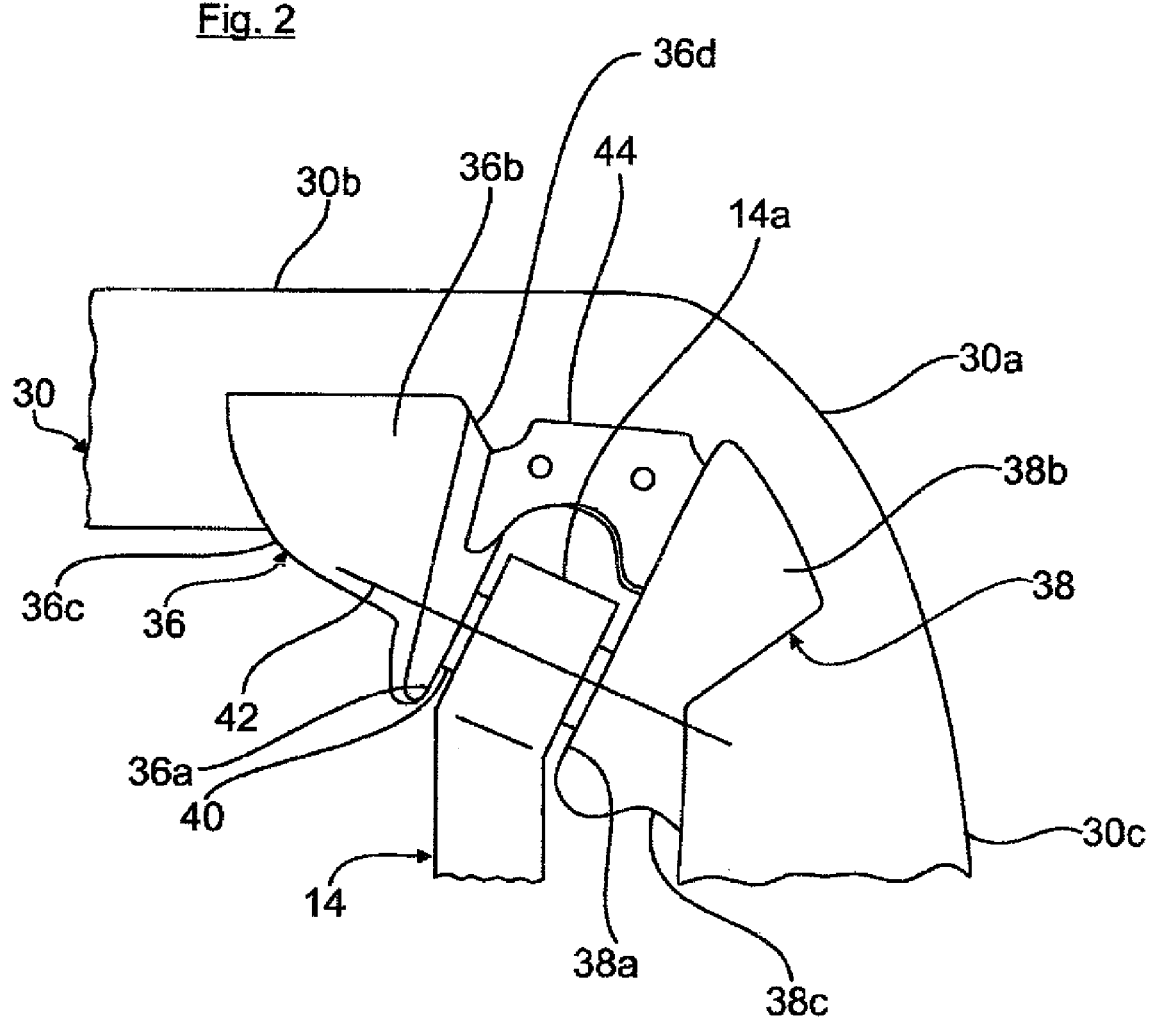

APPARATUS FOR REINFORCING A SUPPORTING SUBFRAME

CROSS-REFERENCES TO RELATED APPLICATIONS

This application is the U.S. National Stage of International Application No. PCT/EP2013/000960, filed Mar. 30, 2013, which designated the United States and has been published as International Publication No. WO 2013/152833 and which claims the priority of German Patent Application, Serial No. 10 2012 007 327.5, filed Apr. 12, 2012, pursuant to 35 U.S.C. 119(a)-(d).

BACKGROUND OF THE INVENTION

The present invention relates to an apparatus for reinforcing a supporting subframe for motor vehicles.

In a 5-link suspension, the upper transverse arms are normally placed anteriorly of the spring and the damper or the suspension strut. By arranging the rear upper control arm or transverse arm behind the spring or the damper or suspension strut, this suspension link points far to the rear. As a result, either the subframe must be made very long, extend below the transverse arm, and a support must be realized to the body longitudinal member, or the subframe has to be configured with a severe arc in the rear region.

Such subframes normally support drive units of the motor vehicle and have articulated thereto the links of the wheel suspension so that they can be installed in a complete assembly unit. The subframes are usually connected in a four-point suspension with longitudinal members and/or cross members of the structure of the motor vehicle via vibration-damping subframe bearings. As a result, the static and dynamic forces and moments have to be introduced via the subframe into the structure of the motor vehicle so that the subframe has to be constructed appropriately sturdy. For structural and constructional reasons, it may be necessary to curve the longitudinal beams of the subframe to provide, for example, the required freewheel of links or to realize links of defined length, causing weak spots in particular in the area of the curvature.

SUMMARY OF THE INVENTION

Object of the invention is to propose an apparatus of the afore-mentioned type which is able to realize an effective localized reinforcement of a subframe with ease.

The object is attained by an apparatus for reinforcing a supporting subframe for motor vehicles, including two longitudinal beams and at least one crossbeam, with the links of wheel suspensions on both sides being articulated to the longitudinal beams via radially protruding, fixed mounts by rubber-metal sleeve bearings, and with the longitudinal beams including at least in one region of articulation of a link a longitudinally extending portion and a transversely extending portion which define an approximately 90° curvature, wherein the mounts are configured as two brackets, with one of which being supported on the longitudinally extending portion of the longitudinal beams and the other one of which being supported on the transversely extending portion, and that the brackets form a diagonal support of the curved region with a load path bridging the 90° curvature and extending between the longitudinally extending portion and the transversely extending portion. Advantageous further refinements and configurations of the invention are subject matter of the dependent claims.

According to the invention, it is proposed to configure the mounts for the links of the wheel suspension as two brackets, one of which being supported on the longitudinally extending portion of the longitudinal beams and the other one of which being supported on the transversely extending portion, with their base walls oriented in parallel relation being firmly connected with the bearing sleeve of the rubber-metal sleeve bearing via a screw fastener. The proposed design effectively forms a diagonal support of the curved region or of a load path bridging the curvature, in which the screw fasteners and the bearing sleeve forming the bearing core are incorporated. The proposed, local reinforcement effectively saves the possible need for an otherwise necessary, general reinforcement of the subframe, for example by increase of material thickness or increase in cross section.

To realize a durable and rigid unitary structure, the base walls of the brackets can embrace the longitudinal beams in a semi-circular manner and the base wall and their side walls can be welded to the longitudinal beams.

It is further proposed to provide the base wall of the brackets of the transversely extending portion of each of the longitudinal beams with a collar which protrudes in force line of action of the screw fastener and is supported directly on the transversely extending portion of the longitudinal beams, wherein the direct support in the force line of action enables a configuration of the brackets in a weight-saving manner.

Furthermore, the brackets connected with the longitudinally extending portion of the longitudinal beams can be configured in the shape of a cup with a cover wall connecting to the two side walls and the base wall to thereby form a self-contained stable, weight-effective structure.

An additional stiffening of the curved portion of the longitudinal beams in a structurally and simple manner in terms of manufacture is realized by providing between the two base walls of the brackets on the upper side and/or top side one or two stiffening plates which are secured to the base walls and, optionally, to the longitudinal beam and which are positioned within the point of articulation.

Finally the stiffening plate may be formed with flanges which are bent at a right angle and are firmly connected with the base walls and, optionally, with the longitudinal beams, for example, by simple spot welding joints.

BRIEF DESCRIPTION OF THE DRAWING

An exemplary embodiment of the invention is explained in greater detail hereinafter with reference to the accompanying schematic drawings. It is shown in:

FIG. 2 an enlarged illustration, taken along the line I-I in FIG. 1, of the brackets forming the reinforcement of the longitudinal beam with articulation of the link via the rubber-metal sleeve bearing and the additional reinforcement plate.

DETAILED DESCRIPTION OF PREFERRED EMBODIMENTS

Figure 1:
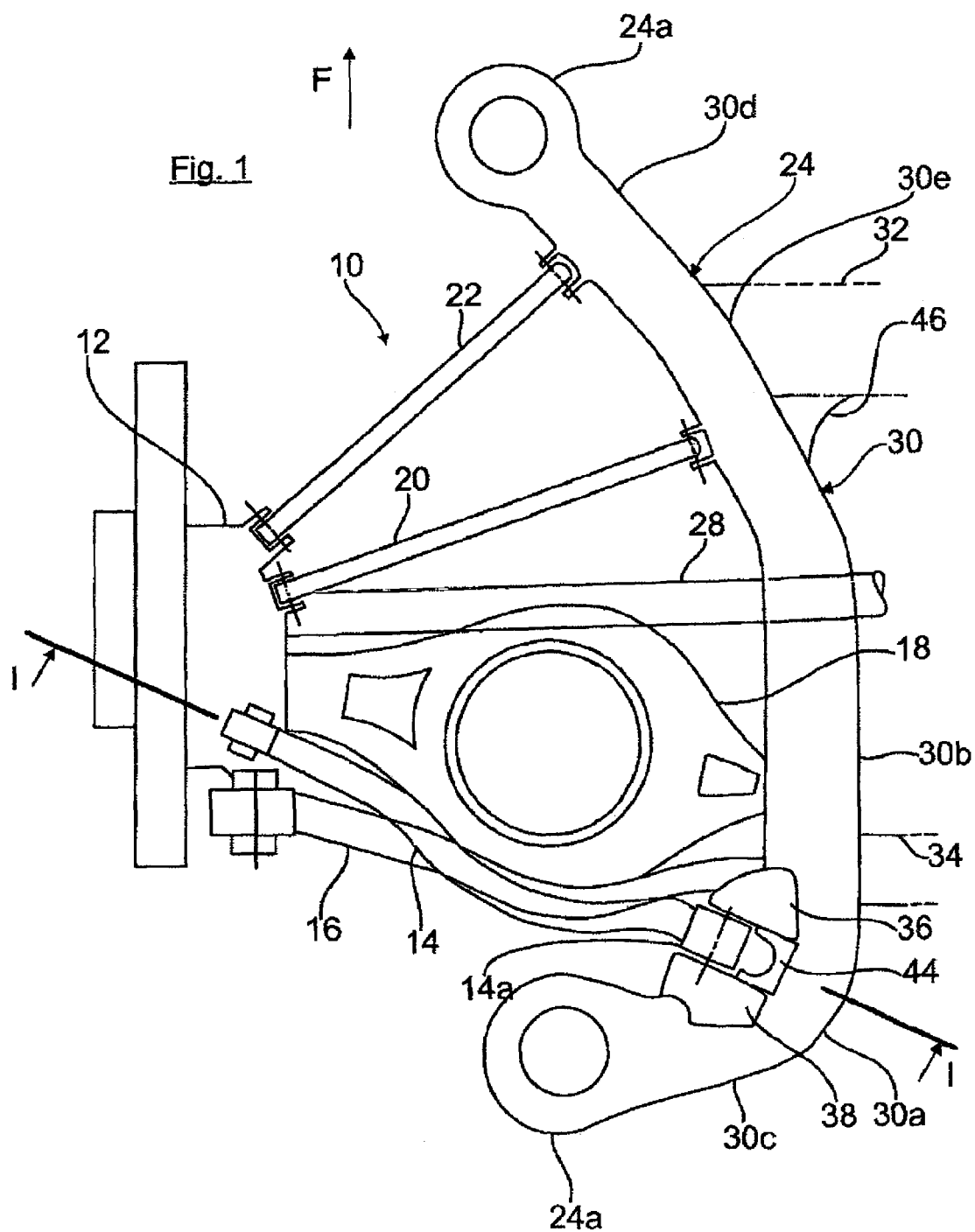
FIG. 1 a plan view of a left-hand wheel suspension of a motor vehicle and a only partially shown subframe with a curved longitudinal beam and crossbeams, and with a reinforcement in a curved region of the longitudinal beam by means of two brackets and a rubber-metal sleeve bearing of an articulated link of the wheel suspension.

FIG. 1 shows a plan view of a left-hand rear wheel suspension 10 of a motor vehicle, which is only described insofar as it is necessary for the understanding of the invention.

The wheel carrier 12 of the wheel suspension 10 is mounted on a 5-link axle in which the wheel carrier 12 is guided via five, spatially separated links 14, 16, 18, 20, 22, which in turn are articulated on a subframe 24, only shown in part. Further, a cardan shaft 28 of a drive unit (not shown) for driving the rear wheel can be seen.

The subframe 24 is composed of two longitudinal beams 30 (only the left-hand longitudinal beam 30 is shown, the right-hand one is essentially a mirror image thereof) and two crossbeams 32, 34 and is connected in a four-point bearing via bearing mounts 24a with the structure of the motor vehicle (not shown), for example with longitudinal members, via rubber-elastic subframe bearings. The drive unit (e.g., a rear axle differential, not visible) is mounted to the subframe 24.

For design and constructive reasons, the longitudinal beams 30 of the subframe 24 are configured curved, as shown, with, i.a., a curvature 30a of about 90 degrees.

The involved links 16, 18, 20, 22 are articulated in conventional manner via bearing mounts to the rubber-metal sleeve bearings and to the longitudinal beams 30 via respective brackets arranged on the longitudinal beam 30, while the articulation of the upper link 24 trailing in the travel direction F is configured in the region of the curvature 30a as follows (FIG. 2):

Secured to the longitudinal beam 30 of approximately circular cross-section are two brackets 36, 38, of which the one bracket 36 is secured to the longitudinal portion 30b of the longitudinal beam 30 and the other bracket 38 of which is secured to the substantially transversely extending portion 30c of the longitudinal beam 30 by weld joints.

The base wall 36a, 38a of the brackets 36, 38 aligned in parallel relationship form a fork and accommodate there between the bearing sleeve 40 of a rubber-metal sleeve bearing not shown any further, which is inserted into the bearing eye 14a of the link 14 in a known manner. The bearing sleeve 40 mounted between the base walls 36a, 38a of the brackets 36, 38 defines a pivot axis, shown by a dash-dot line in FIG. 1, about which the link 14 can pivot.

Adjoining the base wall 36a of the cup-shaped bracket 36 are side walls 36b (only the upper side wall 36b is visible) and a cover wall 36c. Further, the end faces 36d of the base wall 36a are configured semicircular and partly embrace the longitudinal beam 30, with the marginal regions of the side walls 36b, the base wall 36a, and the cover wall 36c being respectively welded with the longitudinal beam 30b.

The bracket 38, which is also cup-shaped, also includes two side walls 38b adjacent to the base wall 38a, and a semi-circular end face (not visible) of the base wall 38a, which embrace, similar to the bracket 36, the portion 30c of the longitudinal beam 30 and are respectively welded with their marginal regions with the longitudinal beam 30.

Furthermore, formed on the bracket 38 is a collar 38c which extends in line of action 42, indicated by dash-dot lines, and which, as shown, is supported on the portion 30c of the longitudinal beam 30 and welded thereto.

Placed within the bearing eye 14a of the link 14 between the base walls 36a, 38a of the brackets 36, 38 is a stiffening plate 44 which has marginal regions, facing the base walls 36a, 38a, and a marginal area, facing the curved region 30a of the longitudinal beam, which are firmly connected by respective weld joints with the base walls 36a, 38a and the longitudinal beam 30.

The involved marginal regions of the stiffening plate 44 may, optionally, be formed by flanges (not shown) angled by 90 degrees and firmly connected by spot welding with the adjacent brackets 36, 38 and the longitudinal beam 30.

The two brackets 36, 38 form, in combination with the bearing sleeve 40 and the screw fastener, an additional load path (line of action 42), which stiffens the longitudinal beams 30 in the region of the curvature 30a in a not insignificant manner. In addition, the inner stiffening plate 44 can be used in the illustrated form or a similar form. As an alternative to the shown variant, it is also possible to arrange the stiffening plate 44 at the top and/or at the bottom.

The invention is not limited to the illustrated exemplary embodiment. If necessary, the longitudinal beams 30 of the subframe 24 may also have a different cross-sectional shape, for example oval or square. As materials, steel or light metal can be used.

The longitudinal beams 30 may, as is apparent from FIG. 1, also be designed to directly merge a front portion 30d of the longitudinal bars 30 into the crossbeam 32 and to attach or weld the further portions of the longitudinal beams 30 to the transition zone 30e. A gusset plate 46 may be used in this zone, as shown.

What is claimed is:

1. Apparatus, comprising:
   a subframe for a motor vehicle, said subframe including two longitudinal beams and at least one crossbeam; and
   a reinforcement for reinforcing the subframe, said reinforcement including radially protruding fixed mounts in the form of two brackets and configured to articulate links of a wheel suspension to the longitudinal beams via rubber-metal sleeve bearings, each longitudinal beam including at least in one region of articulation of one of the links a longitudinally extending portion and a transversely extending portion which define an approximately 90° curvature,
   wherein one of the brackets is supported on the longitudinally extending portion and the other one of the brackets is supported on the transversely extending portion, and
   wherein the brackets form a diagonal support in a region of the 90° curvature with a load path bridging the 90° curvature and extending between the longitudinally extending portion and the transversely extending portion.

2. The apparatus of claim 1, wherein the transversely extending portion of the longitudinal beam is stiffened by the brackets supported on the longitudinally extending portion and the transversely extending portion.

3. The apparatus of claim 1, wherein the longitudinally extending portion and the transversely extending portion provide an additional support of the transversely extending portion with a bearing sleeve of the rubber-metal sleeve bearing.

4. The apparatus of claim 1, wherein the brackets have base walls which are oriented in parallel relationship, and further comprising a screw fastener to firmly connect the base walls with a bearing sleeve of the rubber-metal sleeve bearing.

5. The apparatus of claim 4, wherein the base walls of the brackets embrace the longitudinal beams in a semicircular manner.

6. The apparatus of claim 4, wherein the base walls and side walls of the brackets are welded to the longitudinal beams.

7. The apparatus of claim 6, wherein at least one of the brackets is configured in the form of a cup and has a cover wall adjoining the side walls and the base walls.

8. The apparatus of claim 4, wherein the base wall of the other one of the brackets has a collar protruding in line of action of the screw fastener and supported directly on the transversely extending portion of the longitudinal beam.

9. The apparatus of claim 4, wherein the reinforcement has one or two stiffening plates provided between the base walls of the brackets.

10. The apparatus of claim 9, wherein the one or two stiffening plates is/are secured to the longitudinal beam and positioned in the at least one region of articulation point of the one link.

11. The apparatus of claim 9, wherein the one or two stiffening plates is/are formed with flanges which are bent at a right angle and welded with the base walls.

12. The apparatus of claim 11, wherein the one or two stiffening plates is/are welded, with the longitudinal beams.

* * * * *